United States Patent
Ohara (10) Patent No.: US 7,278,705 B2
(45) Date of Patent: Oct. 9, 2007

(54) POWER MANAGEMENT CONTROL METHOD AND PRINTING APPARATUS

(75) Inventor: Keiji Ohara, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 498 days.

(21) Appl. No.: 10/842,484

(22) Filed: May 11, 2004

(65) Prior Publication Data

US 2004/0227970 A1    Nov. 18, 2004

(30) Foreign Application Priority Data

May 13, 2003    (JP)    ............... 2003-134738

(51) Int. Cl.
    *B41J 29/38*    (2006.01)
    *B41J 2/165*    (2006.01)

(52) U.S. Cl. .......................... 347/23; 347/5

(58) Field of Classification Search .............. 347/5, 347/23

See application file for complete search history.

(56) References Cited

U.S. PATENT DOCUMENTS

| 4,723,129 A | * | 2/1988 | Endo et al. ............... 347/56 |
| 5,815,175 A | * | 9/1998 | Seikel ..................... 347/23 |
| 2002/0122088 A1 | | 9/2002 | Hata et al. |

FOREIGN PATENT DOCUMENTS

| EP | 1 035 499 | 9/2000 |
| JP | 2000-326590 | 11/2000 |
| JP | 2001-180083 | 7/2001 |
| JP | 2002-103591 | * 4/2002 |
| JP | 2002-103739 | 4/2002 |
| JP | 2002-225304 | * 8/2002 |
| JP | 2002-254740 | 9/2002 |

* cited by examiner

*Primary Examiner*—Julian D. Huffman
(74) *Attorney, Agent, or Firm*—Fitzpatrick, Cella, Harper & Scinto (57) ABSTRACT

A power management control method of a printing apparatus, which can reduce power consumption of the printing apparatus during a sleep mode and maintain an excellent state of the printing apparatus in a sleep mode, and enables high-quality printing when the printing apparatus returns from the sleep mode to a normal mode. In the printing apparatus employing the present invention which operates in a sleep mode of low power consumption or a normal mode of high power consumption, an event that causes the printing apparatus to shift from the sleep mode to the normal mode is detected, the printing apparatus is shifted from the sleep mode to the normal mode based on the detection result, then it is determined whether or not the detected event is a maintenance operation executed periodically by the printing apparatus to maintain an excellent printing state, execution of the maintenance operation is controlled based on the determination result, and the printing apparatus is returned from the normal mode to the sleep mode.

13 Claims, 7 Drawing Sheets

POWER MANAGEMENT CONTROL METHOD AND PRINTING APPARATUS

CLAIM OF PRIORITY

This application claims priority from Japanese Patent Application No. 2003-134738, entitled "Power Management Control Method" and filed on May 13, 2003, the entire contents of which are incorporated herein by reference.

FIELD OF THE INVENTION

This invention relates to a power management control method and a printing apparatus and, more particularly, to a power management control method of, e.g., an inkjet printer.

BACKGROUND OF THE INVENTION

A conventional inkjet printing apparatus (hereinafter referred to as a printer) has a following basic configuration.

Figure 6:
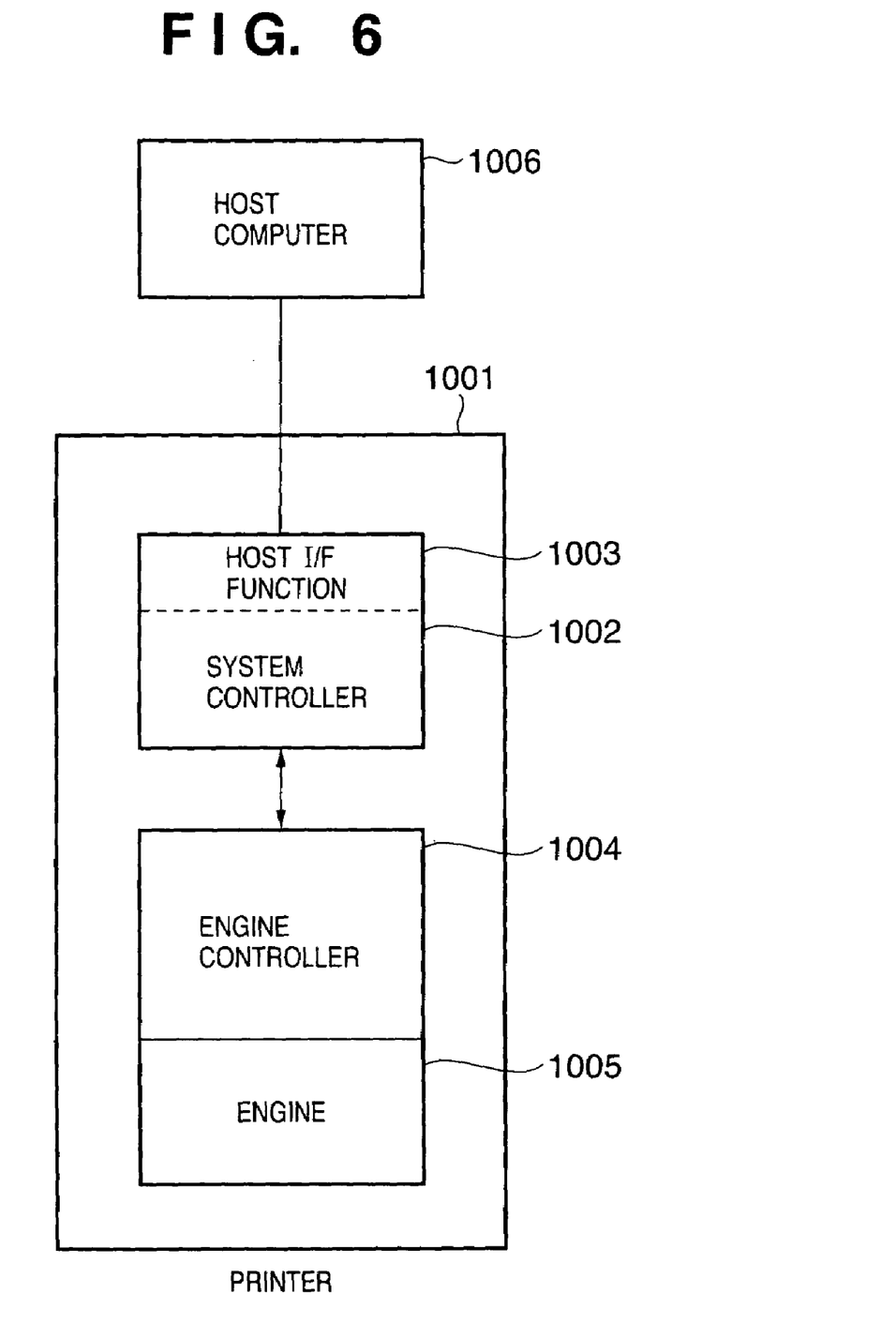
FIG. 6 is a block diagram showing a construction of a conventional printer.

FIG. 6 is a block diagram showing a configuration of a conventional printer. Referring to FIG. 6, numeral 1001 denotes a printer; 1002, a system controller for controlling the entire system of the printer 1001; 1003, a host interface (hereinafter referred to as a host I/F) incorporated in the system controller 1002 for communicating with an external device to exchange printing job data, printer status data and so forth; 1004, an engine controller for controlling various motors, mechanisms, an inkjet printhead (hereinafter referred to as a printhead) and so on based on data from sensors provided at various locations inside the printer 1001; 1005, an engine mainly configured with a mechanism for scanning a printhead while sequentially and intermittently conveying printing paper and for sequentially discharging ink of a designated color from the printhead to a designated position of the printing paper; and 1006, a host computer (hereinafter referred to as a host) which is a typical example of an external device that transmits printing data to the printer 1001.

In the above-described configuration, the host I/F 1003 receives a printing job sent from the host 1006, and transfers it to the system controller 1002. The system controller 1002 performs image processing on image data of the printing job, converts the image data to bitmap data that can be handled by the engine controller 1004, and transfers the bitmap data to the engine controller 1004.

Conventionally, in a case where power of such printer was managed and controlled, since the power consumed by the system controller was relatively small and since it was necessary to maintain operation of the communication function between the printer and the host, the main method of power saving was to cut off the power supplied to the main circuits of the engine and engine controller or to cut off the supply of a basic operation clock when the printer was in a sleep mode.

However, later, as demands became high for better functions and improved throughput of a printer, the circuit size of the system controller has enlarged and the speed of the CPU, memories or the like has increased, resulting in a great increase in power consumption of the system controller (e.g., refer to Japanese Patent Application Laid-Open No. 2002-103739).

For this reason, in recent years, when the printer is in a sleep mode, the power supplied to the main circuits other than the host I/F 1003 or the supply of a basic operation clock is cut off while maintaining the operation of the host I/F 1003 to perform communication with the host 1006 (see FIG. 6). In other words, when the printer 1001 is shifted from a normal operation mode (hereinafter referred to as a normal mode) to a sleep mode, the system controller 1002 and engine controller 1004 simultaneously cut off the power supplied to their main circuits or the supply of a basic operation clock. When the printer 1001 returns from the sleep mode to the normal mode, the system controller 1002 and engine controller 1004 recover the power supplied to their main circuits or the supply of the basic operation clock (e.g., Japanese Patent Application Laid-Open Nos. 2001-180083 and 2000-326590).

Meanwhile, as the image quality of the printer becomes high and the printhead adopts pigmented ink, printers requiring the following particular functions are increasing.

(1) Anti-sedimentation Process

Since pigmented ink is a solution in which pigment particles are dispersed in a solvent by a dispersion agent, sedimentation easily takes place. Therefore, if the ink is left unused for a long time, it becomes impossible to perform printing at predetermined ink density. For this reason, a printer using pigmented ink stirs ink in an ink tank at predetermined time intervals (e.g., Japanese Patent Application Laid-Open No. 2002-225304). This process is called an anti-sedimentation process.

(2) Anti-fading Process

In a printer using roll paper, roll paper processed with special surface treatment for high-quality printing is sometimes used. To convey roll paper of this type by a paper conveyance mechanism of the printer, conveyance rollers or the like apply pressure to hold the roll paper tightly, and rotation of the rollers conveys (moves) the roll paper. When printing operation is not performed (during standby), the printer stays on standby while the conveyance rollers tightly hold the roll paper. However, if the roll paper on which the aforementioned special surface treatment has been applied is left unused for a long time while being tightly held by the conveyance rollers (i.e., while pressure is applied to the paper), the pressured portion of the roll paper is faded in streaks.

Therefore, in a case where the time between one printing operation and the next printing operation is long, in order to prevent conspicuous streaked fading, the printer slightly conveys or rolls up the roll paper at predetermined time intervals so that the streaked fading is not concentrated at one location to be conspicuous (e.g., Japanese Patent Application Laid-Open No. 2002-254740). Hereinafter, such measure will be referred to as an anti-fading process.

Note that the above-described anti-sedimentation process and anti-fading process will be collectively referred to as maintenance operation.

However in the aforementioned conventional example, when the printer operation mode shifts to a sleep mode, the power supplied to the main circuits of the system controller and engine controller or the power supplied to the basic operation clock is cut off. Therefore, the aforementioned anti-sedimentation process or anti-fading process cannot be performed.

If the anti-sedimentation process and anti-fading process are not performed at predetermined time intervals, the effects of these measures are diminished.

To solve this problem, conventionally, in a case where a predetermined time period set for the anti-sedimentation process or anti-fading process has elapsed during the sleep mode, the power supplied to the main circuits of the system controller and engine controller as well as the basic operation clock is simultaneously recovered (i.e., a similar amount of power as that in the normal mode is supplied) to enable execution of the anti-sedimentation process or anti-fading process.

However, according to this countermeasure, the power supplied to the system controller and engine controller is about the same in the sleep mode and in the normal mode. Therefore, it is impossible to reduce power consumption during the sleep mode, raising an additional problem.

SUMMARY OF THE INVENTION

Accordingly, the present invention is conceived as a response to the above-described disadvantages of the conventional art.

For example, the power management control method and a printing apparatus employing the method according to the present invention are capable of reducing power consumption of the printing apparatus during a sleep mode while maintaining an excellent state of the printing apparatus in the sleep mode, and capable of still performing high-quality printing when the printing apparatus returns from the sleep mode to a normal mode.

According to one aspect of the present invention, preferably, there is provided a power management control method of a printing apparatus operating in a first operation mode of low power consumption and a second operation mode of high power consumption, comprising: a detection step of detecting whether or not an event that causes a shift from the first operation mode to the second operation mode has occurred; a determination step of shifting an operation mode of the printing apparatus from the first operation mode to the second operation mode based on a detection result at the detection step, and determining whether or not the event is a maintenance operation executed periodically by the printing apparatus for maintaining an excellent printing state; a maintenance operation control step of performing control to execute the maintenance operation based on a determination result at the determination step; and a return step of returning the operation mode of the printing apparatus from the second operation mode to the first operation mode.

Furthermore, the present invention may be realized by applying the method having the above-described configuration to a printing apparatus. In this case, the printing apparatus preferably has the following configuration.

More specifically, a printing apparatus operative in a first operation mode of low power consumption and a second operation mode of high power consumption, comprises: detection means for detecting whether or not an event that causes a shift from the first operation mode to the second operation mode has occurred; determination means for shifting an operation mode of the printing apparatus from the first operation mode to the second operation mode based on a detection result of the detection means, and determining whether or not the event is a maintenance operation executed periodically by the printing apparatus for maintaining an excellent printing state; maintenance operation control means for performing control to execute the maintenance operation based on a determination result of the determination means; and return means for returning the operation mode of the printing apparatus from the second operation mode to the first operation mode.

To be more specific about the configuration of means for solving the above-described problem, the aforementioned printing apparatus further comprises: a first controller for receiving data transmitted by a host unit, performing image processing on the received data, and generating bitmap data; a second controller for controlling the printing apparatus to execute printing on a printing medium based on the bitmap data; and a mechanism unit for performing printing on the printing medium by conveying the printing medium and scanning a printhead.

The aforementioned event further includes data reception from the host unit and operator's operation using an operation panel of the printing apparatus.

The second controller is capable of switching over between the first operation mode and the second operation mode independently of the first controller, and preferably the second controller includes a timer for notifying execution timing of the maintenance operation.

The maintenance operation can be executed by control of the second controller.

Further, it is preferable that the second controller includes: monitoring means for monitoring whether or not a failure has occurred during execution of the maintenance operation; and control means for performing control so that power is supplied to the entire printing apparatus based on a monitoring result of the monitoring means. The control means designates the first controller to shift from the first operation mode to the second operation mode when the printing apparatus is in the first operation mode.

Moreover, the above-described printing apparatus has an inkjet printhead which performs printing by discharging ink. In this case, preferably the inkjet printhead discharges ink by utilizing heat energy and comprises an electrothermal transducer for generating heat energy to be applied to ink. In addition, preferably the printing apparatus further comprises an ink tank for supplying the inkjet printhead with ink.

In this configuration, the maintenance operation includes: a process for periodically stirring pigmented ink stored in the ink tank; and in a case where the printing medium is roll paper, a process for periodically conveying a slight amount of the roll paper between one printing operation and next printing operation.

The invention is particularly advantageous since it can reduce power consumption of the printing apparatus during a sleep mode while maintaining an excellent state of the printing apparatus in the sleep mode, and enables the printing apparatus to perform high-quality printing when the printing apparatus returns from the sleep mode to a normal mode.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

DETAILED DESCRIPTION OF THE PREFERRED EMBODIMENTS

Preferred embodiments of the present invention will now be described in detail in accordance with the accompanying drawings.

In this specification, the terms "print" and "printing" not only include the formation of significant information such as characters and graphics, but also broadly includes the formation of images, figures, patterns, and the like on a print medium, or the processing of the medium, regardless of whether they are significant or insignificant and whether they are so visualized as to be visually perceivable by humans.

Also, the term "print medium" not only includes a paper sheet used in common printing apparatuses, but also broadly includes materials, such as cloth, a plastic film, a metal plate, glass, ceramics, wood, and leather, capable of accepting ink.

Furthermore, the term "ink" (to be also referred to as a "liquid" hereinafter) should be extensively interpreted similar to the definition of "print" described above. That is, "ink" includes a liquid which, when applied onto a print medium, can form images, figures, patterns, and the like, can process the print medium, and can process ink (e.g., can solidify or insolubilize a coloring agent contained in ink applied to the print medium).

Furthermore, unless otherwise stated, the term "nozzle" generally means a set of a discharge orifice, a liquid channel connected to the orifice and an element to generate energy utilized for ink discharge.

Figure 1:
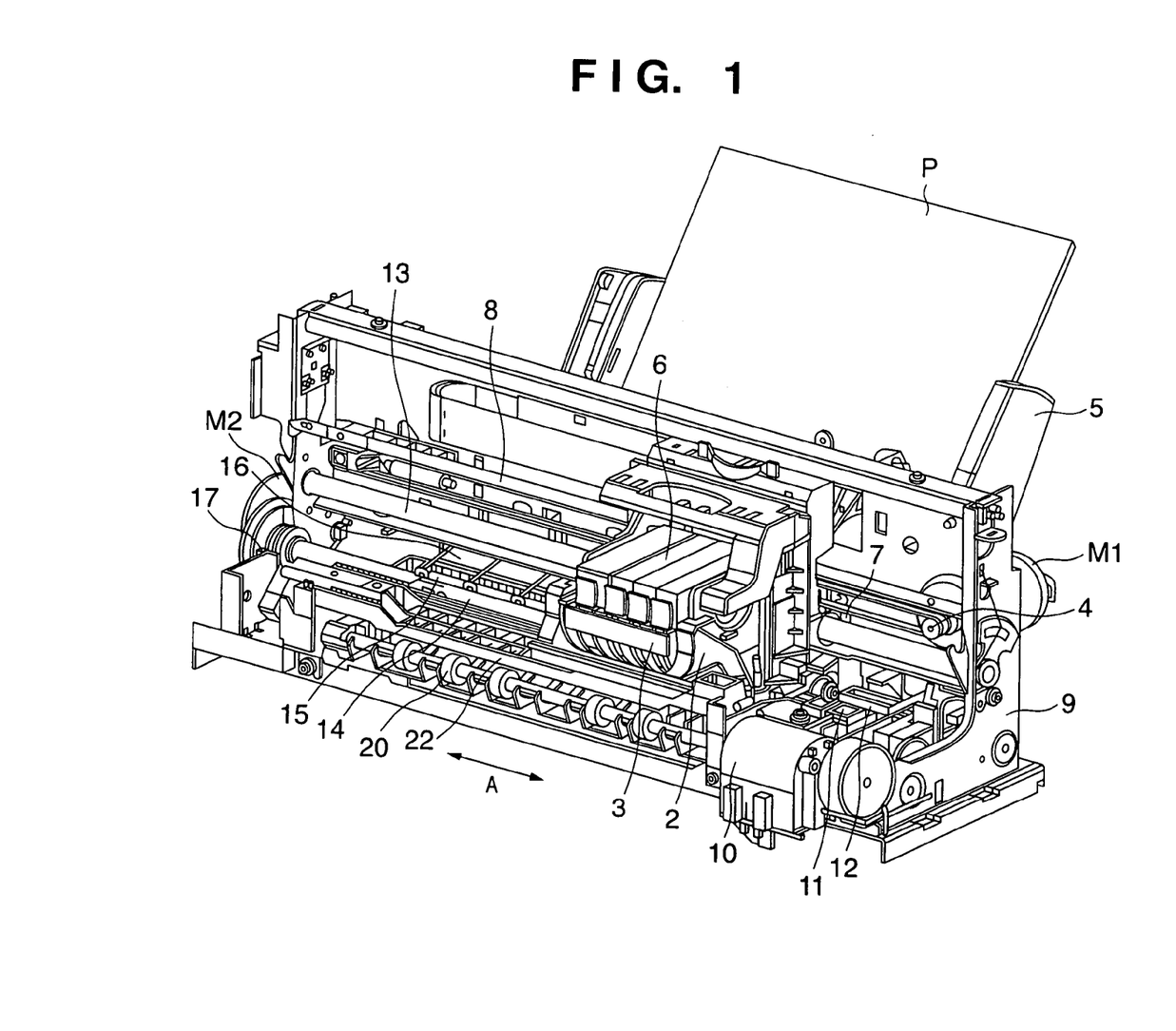
FIG. 1 is a perspective view showing an external appearance of the configuration of a carriage peripheral portion of an inkjet printing apparatus, which is a typical embodiment of the present invention.

FIG. 1 is a perspective view showing an external appearance of the configuration of an inkjet printing apparatus 1 which is a typical embodiment of the present invention.

The inkjet printing apparatus 1 (hereinafter referred to as the printer) shown in FIG. 1 performs printing in the following manner. Driving force generated by a carriage motor M1 is transmitted from a transmission mechanism 4 to a carriage 2 incorporating a printhead 3, which performs printing by discharging ink in accordance with an inkjet method, and the carriage 2 is reciprocally moved in the direction of arrow A. A printing medium P, e.g., printing paper, is fed by a paper feeding mechanism 5 to be conveyed to a printing position, and ink is discharged by the printhead 3 at the printing position of the printing medium P, thereby realizing printing.

To maintain an excellent state of the printhead 3, the carriage 2 is moved to the position of a recovery device 10, and discharge recovery processing of the printhead 3 is intermittently performed.

In the carriage 2 of the printer 1, not only the printhead 3 is mounted, but also an ink cartridge 6 reserving ink to be supplied to the printhead 3 is mounted. The ink cartridge 6 is attachable/detachable to/from the carriage 2.

The printer 1 shown in FIG. 1 is capable of color printing. Therefore, the carriage 2 holds four ink cartridges respectively containing magenta (M), cyan (C), yellow (Y), and black (K) inks. These four cartridges are independently attachable/detachable.

Appropriate contact between the junction surfaces of the carriage 2 and the printhead 3 can achieve necessary electrical connection. By applying energy to the printhead 3 in accordance with a printing signal, the printhead 3 selectively discharges ink from plural discharge orifices, thereby performing printing. In particular, the printhead 3 according to this embodiment adopts an inkjet method which discharges ink by utilizing heat energy, and comprises electrothermal transducers for generating heat energy. Electric energy applied to the electrothermal transducers is converted to heat energy, which is then applied to ink, thereby creating film boiling. This film boiling causes growth and shrinkage of a bubble in the ink, and generates a pressure change. By utilizing the pressure change, ink is discharged from the discharge orifices. The electrothermal transducer is provided in correspondence with each discharge orifice. By applying a pulsed voltage to the corresponding electrothermal transducer in accordance with a printing signal, ink is discharged from the corresponding discharge orifice.

As shown in FIG. 1, the carriage 2 is connected to a part of a driving belt 7 of the transmission mechanism 4 which transmits driving force of the carriage motor M1, and is slidably supported along a guide shaft 13 in the direction of arrow A. Therefore, the carriage 2 reciprocally moves along the guide shaft 13 in accordance with normal rotation and reverse rotation of the carriage motor M1. In parallel with the moving direction of the carriage 2 (direction of arrow A), a scale 8 is provided to indicate an absolute position of the carriage 2. In this embodiment, the scale 8 is a transparent PET film on which black bars are printed in necessary pitches. One end of the scale 8 is fixed to a chassis 9, and the other end is supported by a leaf spring (not shown).

In the printer 1, a platen (not shown) is provided opposite to the discharge orifice surface where discharge orifices (not shown) of the printhead 3 are formed. As the carriage 2 incorporating the printhead 3 is reciprocally moved by the driving force of the carriage motor M1, a printing signal is supplied to the printhead 3 to discharge ink, and printing is performed on the entire width of the printing medium P conveyed on the platen.

Furthermore, in FIG. 1, numeral 14 denotes a conveyance roller driven by a conveyance motor M2 for conveying the printing medium P. Numeral 15 denotes a pinch roller that presses the printing medium P against the conveyance roller 14 by a spring (not shown). Numeral 16 denotes a pinch roller holder which rotatably supports the pinch roller 15. Numeral 17 denotes a conveyance roller gear fixed to one end of the conveyance roller 14. The conveyance roller 14 is driven by rotation of the conveyance motor M2 transmitted to the conveyance roller gear 17 through an intermediate gear (not shown).

Numeral 20 denotes a discharge roller for discharging the printing medium P, where an image is formed by the printhead 3, outside the printer. The discharge roller 20 is driven by receiving rotation of the conveyance motor M2. Note that the discharge roller 20 presses the printing medium P by a spur roller (not shown) that presses the printing medium by a spring. Numeral 22 denotes a spur holder which rotatably supports the spur roller.

Furthermore, the printer 1 includes the recovery device 10 for recovering discharge failure of the printhead 3, which is arranged at a desired position (e.g., a position corresponding to the home position) outside the reciprocal movement range for printing operation (outside the printing area) of the carriage 2 that incorporates the printhead 3.

The recovery device 10 comprises a capping mechanism 11 for capping the discharge orifice surface of the printhead 3, and a wiping mechanism 12 for cleaning the discharge orifice surface of the printhead 3. In conjunction with the capping operation of the capping mechanism 11, suction means (suction pump or the like) of the recovery device enforces ink discharge from the discharge orifices, thereby executing discharge recovery operation, that is, removing high-viscosity ink and bubbles in the ink channel of the printhead 3.

In addition, when printing operation is not performed, the discharge orifice surface of the printhead 3 is capped by the capping mechanism 11 for protecting the printhead 3 and preventing ink from evaporation and drying. The wiping mechanism 12 is arranged in the neighborhood of the capping mechanism 11 for wiping off an ink droplet attached to the discharge orifice surface of the printhead 3.

By virtue of the capping mechanism 11 and wiping mechanism 12, a normal ink discharge condition of the printhead 3 can be maintained.

Figure 2:
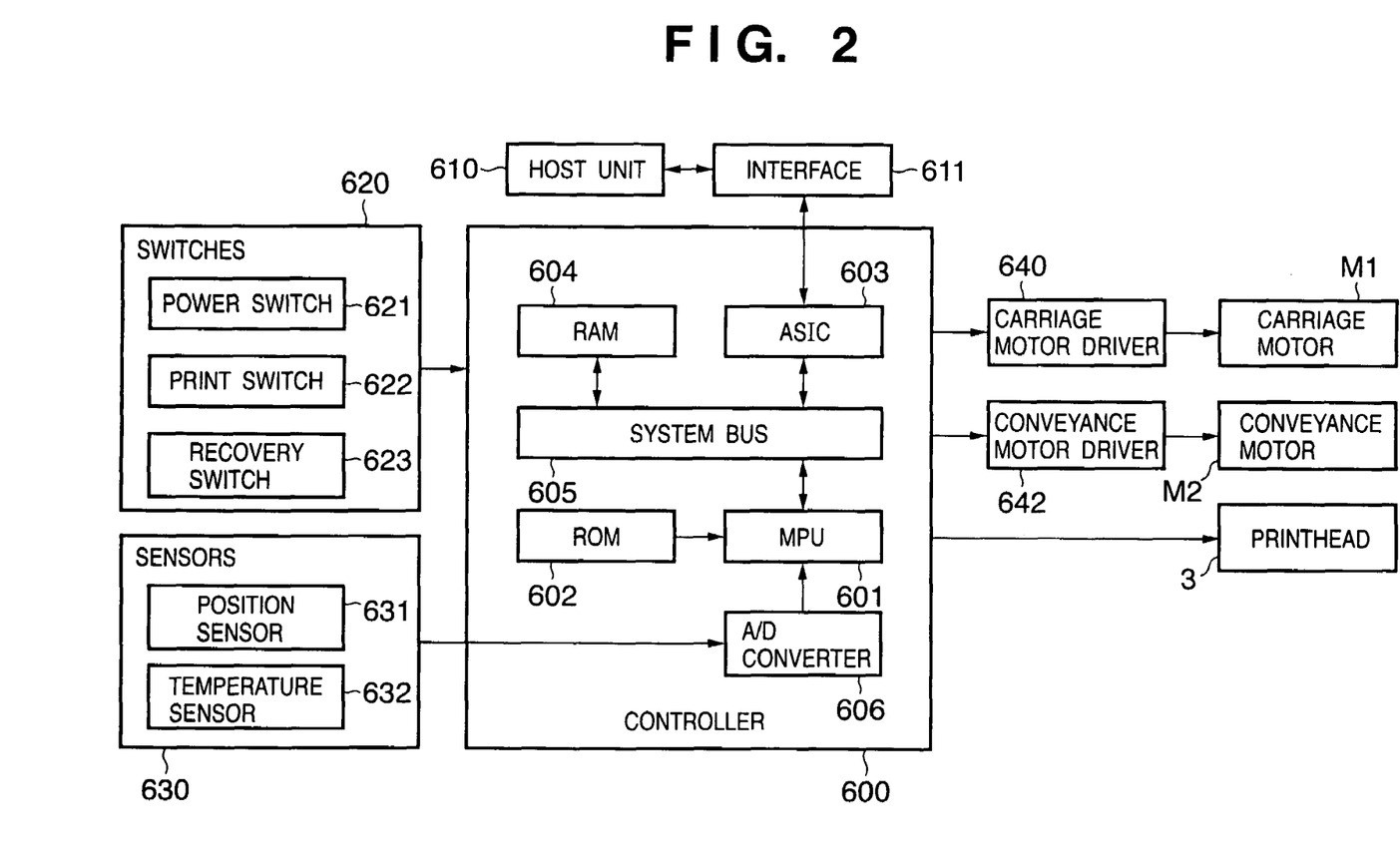
FIG. 2 is a block diagram showing a control structure of the printing apparatus shown in FIG. 1.

FIG. 2 is a block diagram showing a control structure of the printer shown in FIG. 1.

Referring to FIG. 2, a controller 600 comprises: an MPU 601; ROM 602 storing a program corresponding to the control sequence which will be described later, predetermined tables, and other fixed data; an Application Specific Integrated Circuit (ASIC) 603 generating control signals for controlling the carriage motor M1, conveyance motor M2, and printhead 3; RAM 604 providing an image data developing area or a working area for executing a program; a system bus 605 for mutually connecting the MPU 601, ASIC 603, and RAM 604 for data transmission and reception; and an A/D converter 606 performing A/D conversion on an analog signal inputted by sensors which will be described later and supplying a digital signal to the MPU 601.

In FIG. 2, numeral 610 denotes a computer serving as an image data supplying source (or an image reader, digital camera or the like), which is generically referred to as a host unit. Between the host unit 610 and printer 1, image data, commands, status signals and so forth are transmitted or received via an interface (I/F) 611.

Numeral 620 denotes switches for receiving commands from an operator, which includes a power switch 621, a print switch 622 for designating a print start, and a recovery switch 623 for designating a start of the processing (recovery processing) aimed to maintain an excellent ink discharge state of the printhead 3. Numeral 630 denotes sensors for detecting an apparatus state, which includes a position sensor 631 such as a photo-coupler for detecting a home position h, and a temperature sensor 632 provided at an appropriate position of the printer for detecting an environmental temperature.

Numeral 640 denotes a carriage motor driver which drives the carriage motor M1 for reciprocally scanning the carriage 2 in the direction of arrow A. Numeral 642 denotes a conveyance motor driver which drives the conveyance motor M2 for conveying the printing medium P.

When the printhead 3 is scanned for printing, the ASIC 603 transfers driving data (DATA) of the printing element (discharge heater) to the printhead 3 while directly accessing the storage area of the RAM 602.

Figure 3:
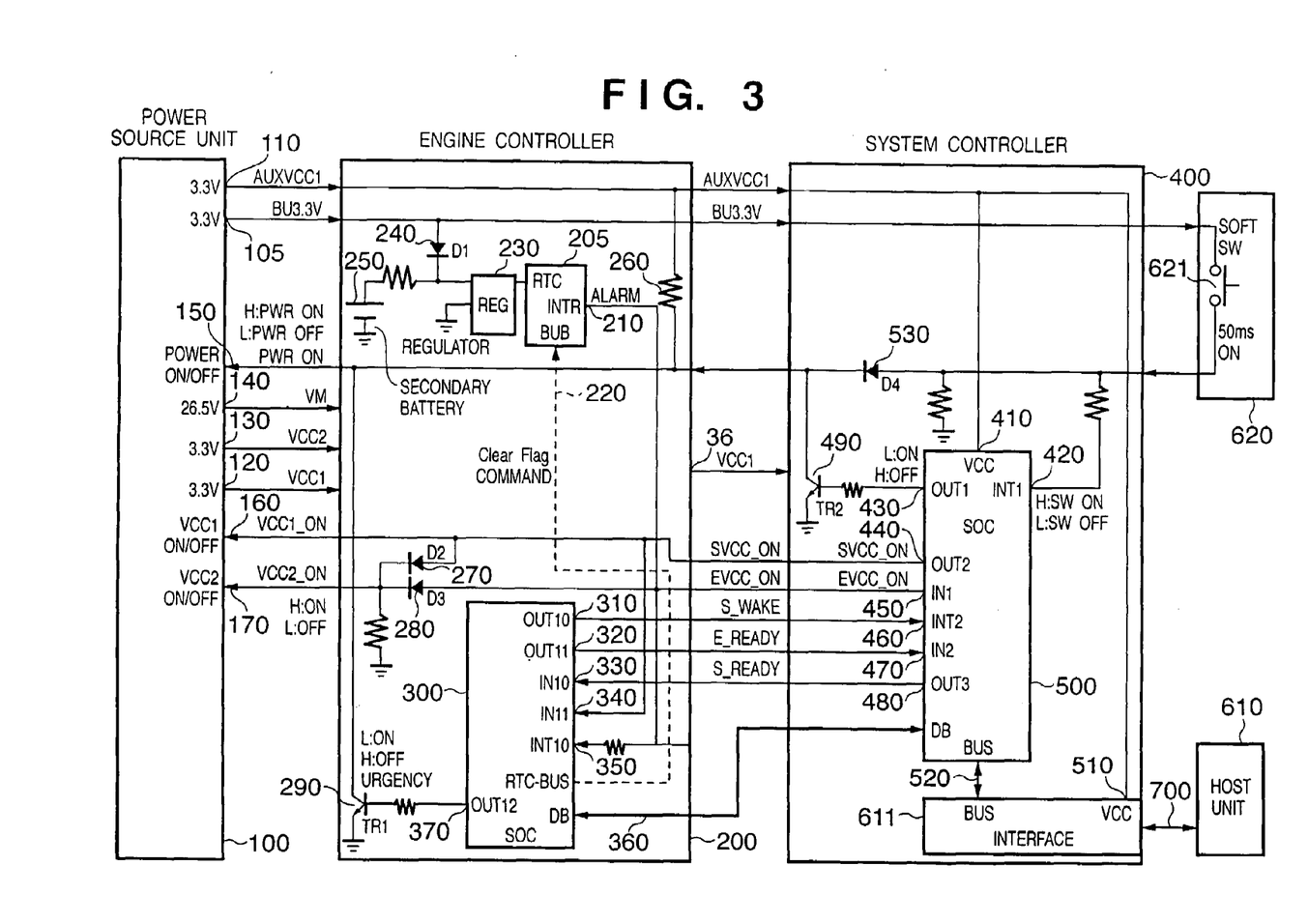
FIG. 3 is a block diagram showing a construction related to power management control in the printing apparatus.

FIG. 3 is a block diagram showing a construction related to power management control in the printer according to the present embodiment.

As is apparent from the comparison between FIG. 2 and FIG. 3, the function of the controller 600 shown in FIG. 2 can be divided into two: the engine controller 200 and system controller 400. The system controller 400 controls the entire system of the printer 1, receives a printing job transmitted from the host unit 610, performs image processing on image data of the printing job, converts the image data to bitmap data that can be handled by engine controller 200, and transfers the bitmap data to the engine controller 200. Meanwhile, the engine controller 200 receives the bitmap data from the system controller 400, and controls the printhead 3 and printing mechanism of the printer 1 shown in FIG. 1 to discharge particular color of ink at the particular position of the printing paper P in accordance with the bitmap data, thereby controlling the printing operation.

Numeral 100 in FIG. 3 denotes a power source unit for supplying power to the entire system of the printer 1.

The switches 620 includes an operation panel having numeric keypads on which an operator operates mode setting of the printer 1 or the like, and an LCD display which displays a printer status or the like.

In FIG. 3, numerals 105 to 140 denote power output terminals of the power source unit 100. Numeral 105 denotes a BU 3.3V power line, which always outputs backup power 3.3V when power is supplied to the primary side of the power source unit (i.e., when the power cable of the printer 1 is plugged in an AC socket). Numeral 110 denotes an AUXVCC1 power line, which always outputs auxiliary power 3.3V when the printer 1 is turned on regardless of whether a normal mode or a sleep mode is set. Numeral 120 denotes a VCC1 power line for the system controller, which outputs 3.3V in the normal mode of the printer but is cut off in the sleep mode. Numeral 130 denotes a VCC2 power line for the engine controller, which outputs 3.3V in the normal mode of the printer but is cut off in the sleep mode. Numeral 140 denotes a VM power line for supplying a high voltage for driving the printhead or the like.

Numeral 150 to 170 denote input terminals for controlling power line outputs. Numeral 150 denotes a control terminal PWR_ON for controlling power ON/OFF of the entire power source unit (i.e., power ON/OFF of the printer). Numeral 160 denotes a control terminal VCC1_ON for controlling ON/OFF of the VCC1 power line 120. Numeral 170 denotes a control terminal VCC2_ON for controlling ON/OFF of the VCC2 power line 130 and VM 140.

The aforementioned power ON/OFF control terminals are turned ON at high ("H") level and turned OFF at low ("L") level.

Next, components and control signals of the engine controller 200 are described.

In FIG. 3, numerals 205 to 300 are provided for the components and control signals of the engine controller 200.

Numeral 205 denotes a real time clock (RTC) having a clocking function, timer function, alarm function and the like. Numeral 210 denotes an alarm (interruption request) signal (ALARM) for informing an external unit of the fact that the timer function or alarm function of the RTC 205 detects a lapse of timer-set value or an alarm-set time. Numeral 220 denotes an RTC control bus (RTC-BUS) which outputs a control signal for controlling the RTC 205. Numeral 230 denotes a regulator (REG) for controlling a power voltage from the backup power source BU (3.3V) or the secondary battery 250 and supplying an appropriate voltage to the RTC 205. Numeral 240 denotes a diode (D1) which prevents power of the secondary battery 250 from inflowing to the off-state backup power line BU (3.3V) when the power cable of the printer is unplugged.

Numeral 260 denotes a pull-up resistor for maintaining the PWR_ON signal at "H" level after the PWR_ON signal is at "H" level for more than 50 ms (millisecond) during execution of a power-on sequence and the AUXVCC1 is outputted. Numerals 270 and 280 denote diodes (D2 and D3) that can control a signal transmitted to the VCC2_ON 170 by "logical OR" of the two control signals (i.e., if one of the two signals is at "H" level, the signal to the VCC2_ON 170 is activated). Numeral 290 denotes a transistor (TR1) used for compulsorily lowering the PWR_ON signal to "L" level. Numeral 300 denotes a System On Chip (SOC) serving as a core of the engine controller, which is configured with an MPU controlling the entire engine controller and its peripheral circuits.

The input/output ports and bus of the SOC 300 are described.

In FIG. 3, numerals 310 to 370 are provided for the input/output ports and bus of the SOC 300.

Numeral 310 denotes a port (OUT10) for outputting a signal (S_WAKE) for returning a SOC 500 of the system controller 400 in the sleep mode (low power consumption state) to the normal mode (normal operation state). Numeral 320 denotes a port (OUT11) for outputting a signal (E_READY) indicative of a state that the engine controller 200 is communicatable to the system controller 400. Numeral 330 denotes a port (IN10) for inputting a signal (S_READY) indicative of a state that the system controller 400 is communicatable to the engine controller 200. Numeral 340 denotes a port (IN11) for monitoring and inputting a signal (SVCC_ON) that controls the VCC_ON terminal by the SOC 500 of the system controller 400. Numeral 350 denotes an interruption input port (INT10) for the SOC 300 to receive an alarm signal (ALARM) of the RTC 205.

Numeral 360 denotes a data bus for exchanging data such as printing data, control commands, printer status data and the like, while performing communication control with the S_READY or E_READY signal between the SOC 300 and SOC 500, i.e., between the system controller 400 and engine controller 200. Numeral 370 denotes an output port (OUT12) for controlling the transistor (TR1) 290 used for compulsorily lowering the PWR_ON signal to "L" level.

Next, components and control signals of the system controller 400 are described.

In FIG. 3, numerals 410 to 530 are provided for the components and control signals of the system controller 400.

Numeral 500 denotes a SOC serving as a core of the system controller 400, which is configured with an MPU controlling the entire system controller and its peripheral circuits. Numeral 410 denotes a power input terminal of the SOC 500. Numeral 420 denotes an interruption input port (INT1) for detecting by the SOC 500 the depression of the power switch 621 on the operation panel. Numeral 430 denotes an output port (OUT1) for controlling a transistor (TR2) which will be described later. Numeral 440 denotes a port (OUT2) for outputting a signal (SVCC_ON) for controlling the VCC1_ON terminal 160 (and further VCC2_ON terminal 170) by the SOC 500. Numeral 450 denotes a port (IN1) for monitoring and inputting a signal (EVCC_ON) for controlling the VCC2_ON terminal 170 by the SOC 500. Numeral 460 denotes an interruption signal input port (INT2) for inputting an interruption signal (S_WAKE) outputted by the SOC 300 and returning the SOC 500 in the low power consumption state (basic operation clock halted) to the normal operation state. Numeral 470 denotes an input port (IN2) for monitoring and inputting a signal (E_READY). Numeral 480 denotes a port (OUT3) for outputting a signal (S_READY). Numeral 490 denotes a transistor (TR2) for compulsorily lowering the PWR_ON signal to "L" level in accordance with the control signal from the output port 430.

Numeral 510 denotes a power input terminal (VCC) for the interface 611. Numeral 520 denotes an interface control bus for the SOC 500 to connect and control the interface 611. Numeral 530 denotes a diode (D4) which prevents the power voltage (AUXVCC1) from being raised to "H" level at the interruption input port 420 through the pull-up resistor 260 at the time of power-on of the printer. Numeral 700 denotes a communication line between the interface 611 and host unit 610.

In the above-described construction, when the power cable of the printer is unplugged from the AC power source (socket), operation of all the circuits is halted since no power is supplied to all power lines. However, since the RTC 205 is backed by the secondary battery 250, the clocking function of the RTC 205 is operating.

In this state, if the power cable of the printer is plugged in the AC power source, backup power (3.3V) (hereinafter referred to as BU power) is outputted from the terminal 105 of the power source unit 100. This state of the power source unit will be referred to as an OFF state (power-OFF state). At this point, the printing apparatus itself is in power-OFF state. The BU power serves to charge the secondary battery 250 thorough the diode (D1) 240, supply stable power to the RTC 205 through the regulator (REG) 230, and enable to turn on the power source unit 100 (i.e., ON-state of the printer) by feeding back the backup power via the power switch 621 of the operation panel to the PWR_ON control terminal 150 of the power source unit 100.

The PWR_ON control terminal 150 is configured such that the power source unit 100 is turned ON when the signal inputted to this terminal is at "H" level for more than 50 ms and that the power source unit 100 is turned OFF when the signal is at "L" level for more than 50 ms.

Therefore, when the power switch 621 is depressed for more than 50 ms, a voltage is applied in the course of the BU power source of the power source unit 100, engine controller 200, system controller 400, operation panel, power switch 621, system controller 400, diode (D4) 530, engine controller 200, and PWR_ON control terminal 150, then the signal inputted to the PWR_ON control terminal 150 is increased to "H" level. As a result, the power source unit 100 is turned ON.

According to the specification of the power source unit 100 of this embodiment, immediately after the power source unit 100 is shifted from OFF to ON state, all the power output terminals become an ON (output) state for a predetermined period of time (e.g., 500 ms) regardless of the input state at the VCC1_ON terminal 160 or VCC2_ON terminal 170. Therefore, since power is supplied to all components of the printer upon power-ON state of the power source unit 100 as mentioned above, the printer shifts to the normal mode after the power is turned ON (immediately after the power switch 62 is depressed).

Note that if the SOC 500 of the system controller 400 does not control the output port (OUT2) 440 to raise the SVCC_ON signal to "H" level within the predetermined period of time (e.g., 500 ms) immediately after the power is turned ON, the signal level at the VCC1_ON terminal 160 and VCC2_ON terminal 170 becomes "L" level, resulting in off-state outputs VCC1, VCC2 and VM of the output terminals 120 to 140. As a result, the printer is turned OFF by forced termination.

In a case where the SOC 500 cannot be normally operated because of, e.g., a failure or the like, a fail-safe function works. Meanwhile, after the power voltage (AUXVCC1) is outputted within the predetermined time period and the power switch 621 is left open (not depressed) to raise the PWR_ON signal to "H" level through the pull-up resistor 260, the PWR_ON control terminal 150 can be maintained at "H" level so that the printer can continue its operation.

On the contrary, to shift the power-ON state of the printer to power-OFF state, the power switch 621 is depressed again.

When the printer is in the power-ON state, the power voltage (AUXVCC1) is outputted regardless of whether the operation mode of the printer is in the normal mode or sleep mode. Since power is supplied to the SOC 500 and interface 611 using this power source, at least a part of the circuits is operating. Note that in a sleep mode, the printer is in a low power consumption state in which the supply of the basic operation clock to most circuits is cut off and operation is switched to a low-frequency mode. The SOC 500 monitors through the interruption input port (INT1) 420 as to whether or not the power switch 621 is depressed.

Under this condition, if the power switch 621 is depressed and a signal inputted to the interruption input port 420 becomes "H" level, interruption processing is started by the MPU of the SOC 500. If the printer is in a sleep mode, a clock supply from the basic operation clock is recovered at the same time. In the interruption processing, a transistor (TR2) 490 is activated by a control signal from the output port (OUT1) 430, and the PWR_ON signal is compulsorily lowered to "L" level, thereby turning OFF the power source unit 100 (i.e., the printer).

When the printer in the normal mode receives a printing job from the host unit 610, the printing job is transferred to the memory controlled by the SOC 500 through the interface 611. Printing data of the printing job is subjected to image processing, converted to bitmap data for printing, and the bitmap data is transferred to the memory controlled by the SOC 300. Then, ink discharge (corresponding to the bitmap data) is performed on printing paper P by the engine (e.g., printhead 3 shown in FIG. 1) controlled by the engine controller 200, thereby performing printing.

Note, if the printer in the normal mode receives no printing job from the host unit 610 (in other words, the host unit does not transmit any printing job) for more than a predetermined period (e.g. 5 minutes) of time and no operation is performed on the operation panel (the state in which no effective operation is performed and the printer is waiting for an effective operation request will be referred to as a standby state hereinafter), the printer is shifted to a sleep mode.

More specifically, when the SOC 500 detects time out by the internal timer and detects a standby state continued for more than a predetermined period of time, (1) a sleep command is issued from the SOC 500 to the SOC 300;

(2) the SOC 300 receives the sleep command and executes sleep processing (processing that allows the printer to shift to the sleep mode in which power supplied to the engine controller 200 and the engine is cut off);

(3) upon completion of the sleep processing, the SOC 300 returns a sleep-ready status to the SOC 500;

(4) the SOC 500 changes all output signals of the connection signals between the SOC 500 and engine controller 200 to Hi-Z, except the SVCC_ON signal;

(5) the SOC 500 lowers the SVCC-ON signal to "L" level, thereby lowering the input signal to the VCC1_ON control terminal 160 and VCC2_ON control terminal 170 to "L" level, and power outputs VM, VCC1, and VCC2 from the power source unit 100 are cut off (i.e., all power supplied to the engine controller 200 and the engine is cut off); and (6) the system controller 400 also cuts off power supplied to all circuits except the SOC 500 and the interface 611.

Note that since power voltage (AUXVCC1) is supplied to indispensable circuits such as the SOC 500 and the interface 611 in the sleep mode, a shift from the normal mode to the sleep mode is possible. When the printing apparatus shifts from the sleep mode to the normal mode, the power VCC1 is supplied to circuits to which the power has not been supplied in the sleep mode.

Additionally, the SOC 500 internally has a plurality of circuits including an MPU and a plurality of switches. These switches are respectively provided to the plurality of circuits so as to switch ON/OFF of the power AUXVCC1. All of the switches are ON in the normal mode, while some of the switches corresponding to the circuits necessary for the sleep mode is ON in the sleep mode.

By virtue of these features, the system controller 400 can detect data transmission from the host unit 610, e.g., a printing job or the like, and upon detection of print data transmission, the system controller 400 recovers the cut-off power and the supply of the basic operation clock to control the SVCC_ON signal.

During the sleep mode, in the system controller 400, the power (VCC1) does not supply to the circuits except the aforementioned minimum circuits, and the supply of the basic operation clock signal are cut off.

Furthermore, in this sleep mode, the MPU of the SOC 500 executes a HALT command and comes to a HALT state. The MPU in the HALT state can be returned to a normal operation state by a signal inputted from an external unit through an interruption input port.

In the above-described procedure, the printer is shifted to a sleep mode.

If a printing job is transmitted from the host unit 610 during a sleep mode, the interface 611 detects the reception of the printing job, and outputs an interruption request to the MPU of the SOC 500 through the interface control bus 520. In response to this request, the printer is returned from the sleep mode to the normal mode in the following procedure to perform printing;

(1) the MPU of the SOC 500 returns from the HALT state to the normal operation state, and the supply of the basic operation clock that has been cut off in the SOC 500 and the interface 611 is recovered in an interruption processing routine performed in the MPU, and if necessary initialization of the interface 611 or the like is performed;

(2) the SOC 500 raises the SVCC—ON signal to "H" level, thereby raising the input signal to the VCC1_ON control terminal 160 and VCC2_ON control terminal 170 to "H" level, and turning on power outputs VM, VCC1, and VCC2 from the power source unit 100; accordingly, all power supply is recovered;

(3) the SOC 500 checks the E_READY signal to determine whether or not the SOC 500 is communicatable to the SOC 300 (i.e., engine controller 200);

(4) upon confirming that the SOC 300 is communicatable (i.e., E_READY="H"), the output signals of the connection signals between the SOC 500 and engine controller 200 are changed from Hi-Z to an output state; when the SOC 500 becomes communicatable to the SOC 300, S_READY="H" is set;

(5) a recovery factor of the system controller 400 (SOC 500) is notified to the engine controller 200 to have the engine controller 200 get ready for the processing requested thereafter; by this, the printer returns to the normal mode; and (6) if a printing job is consecutively transmitted from the host unit 610 to the interface 611, the SOC 500 receives the printing job from the interface 611, and the above-described normal mode printing processing is performed by the printer.

As described in the section of conventional art, the anti-sedimentation process and anti-fading process must be performed at predetermined time intervals.

Since these processes are executable only by the engine controller and the engine unit, according to this embodiment, the engine controller 200 integrates the RTC 205 so that the MPU of the SOC 300 can control the RTC 205 through the RTC-BUS. Note, since an inkjet printer must periodically perform head cleaning or the like and includes a component such as an ink cartridge or the like that has to be exchanged on regular basis, by nature the printer must integrate the RTC in either the system controller or the engine controller.

The SOC 300 sets in the RTC 205 a time interval for performing the anti-sedimentation process or anti-fading process, and sets a mode where an alarm signal (ALARM) of "H" level is outputted from the interruption request output terminal 210 of the RTC at set time intervals.

In a case where the printer is in the normal mode, since the alarm signal (ALARM) is inputted to the interruption input port (INT10) 350 of the SOC 300, the SOC 300 knows the timing to perform the anti-sedimentation process or anti-fading process. Therefore, the anti-sedimentation process or anti-fading process can be performed at the set time intervals.

On the contrary, in a case where the printer is in the sleep mode, since the power outputs VCC1, VCC2, and VM from the output terminals 120 to 140 are cut off, no power is supplied to the SOC 300. As a result, even if the alarm signal (ALARM) of "H" level is outputted, the SOC 300 cannot directly detect the alarm signal.

However, in the circuitry shown in FIG. 3, when the alarm signal (ALARM) of "H" level is outputted, the EVCC_ON signal line becomes "H" level (the alarm signal line is connected to the EVCC_ON signal line). As a result, the input signal to the VCC2_ON control terminal 170 becomes "H" level, causing the output terminals 130 and 140 to output power VM and VCC2. Accordingly, the engine controller 200 is shifted to the normal mode similarly to the state where the power is turned ON. Immediately after the startup of the engine controller 200, the MPU of the SOC 300 refers to an alarm flag (register) of the RTC 205 through the RTC control bus (RTC-BUS) 220. The alarm flag is ON when the alarm signal (ALARM) of "H" level is outputted. Therefore, by confirming the alarm flag being ON (unlike the time when the power is turned ON), the SOC 300 is informed that it is the timing for performing the anti-sedimentation process or anti-fading process.

Accordingly, it is possible to perform the anti-sedimentation process or anti-fading process at the timing.

In this stage, since the system controller 400 has no factor to recover the SOC 500 and the power supply VCC1 remains being cut off, the sleep mode state, i.e., the low power consumption state, is maintained. Therefore, the anti-sedimentation process or anti-fading process can be performed by only supplying power to the engine controller and the engine unit.

However, the above-described state where anti-sedimentation process or anti-fading process is performed during the sleep mode is still a sleep mode for the entire printer. Therefore, after the anti-sedimentation process or anti-fading process is completed, the SOC 300 transfers to the RTC 205 a Clear Flag command for clearing the alarm flag of the RTC 205, and the alarm flag is turned OFF. By clearing the alarm flag of the RTC 205, the alarm signal is changed to "L" level. As a result, the output signal to the VCC2_ON control terminal 170 becomes "L" level, and the power outputs VM and VCC2 from the output terminals 130 and 140 are again cut off. Then, the printer automatically returns to the sleep mode state to maintain the low power consumption state.

Figure 4:
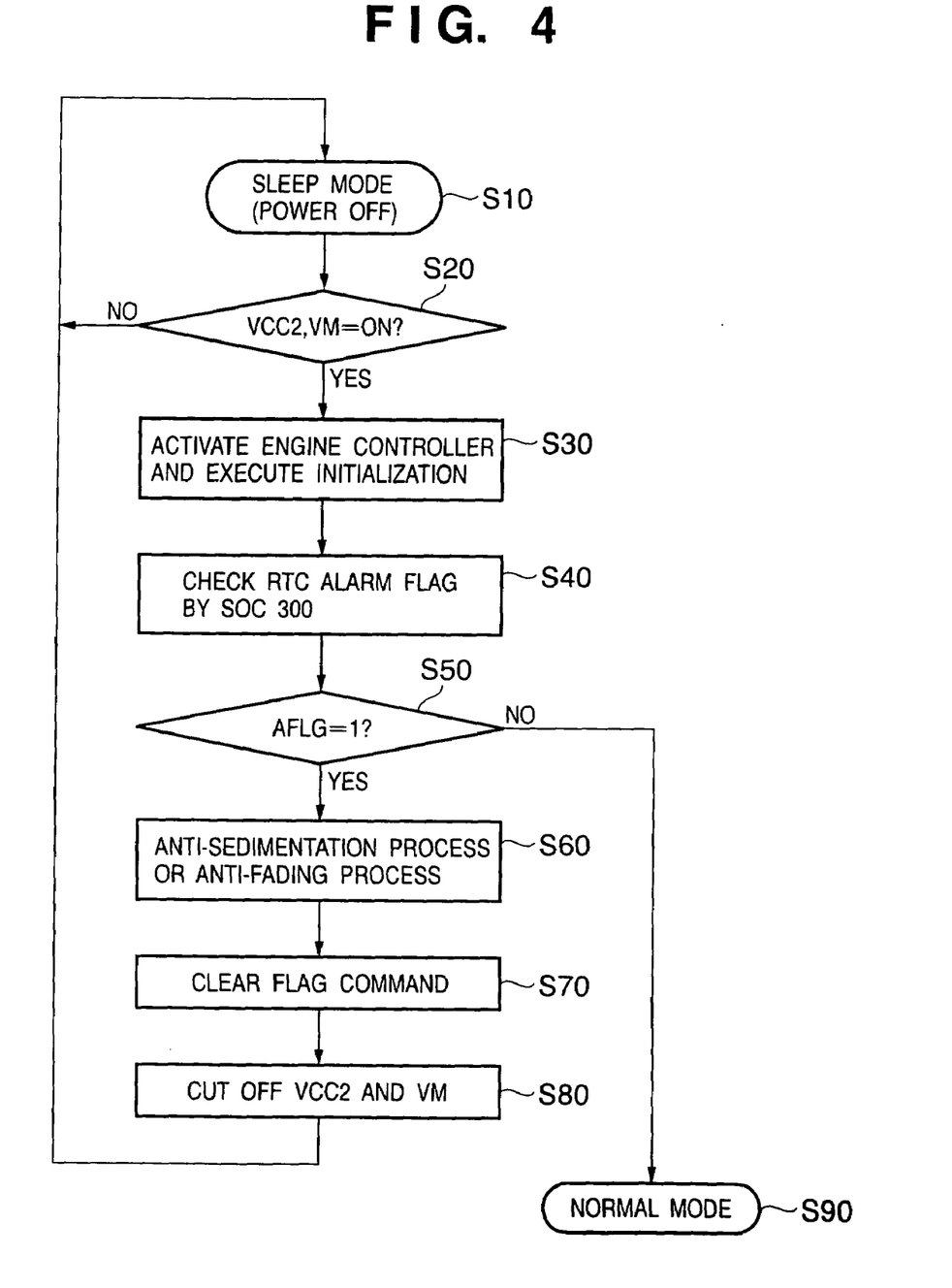
FIG. 4 is a flowchart explaining an execution control of the anti-sedimentation process or anti-fading process executed by an engine controller during a sleep mode.

The above-described processing is summarized in the flowchart in FIG. 4.

FIG. 4 is a flowchart explaining an execution control of the anti-sedimentation process or anti-fading process executed by a firmware of the MPU inside the SOC 300 of the engine controller during a sleep mode.

In step S10 in FIG. 4, the printer is in a sleep mode or power-OFF state in which the power VCC2 and VM supplied to the engine controller 200 is cut off. Note, for the engine controller 200, the state in which the supply of the power VCC2 and VM is cut off does not change regardless of whether the printer is in a sleep mode or in a power-OFF state.

Under this condition, if one of the following events occurs: depression of the power switch 621 (power-ON factor), operation of the operation panel, printing job transmission from the host unit 610 (normal mode recovery factor), or alarm signal (ALARM) transmission from the RTC 205 during the sleep mode (alarm factor), the power VCC2 and VM is supplied as mentioned above. Therefore, in step S20, the SOC 300 determines whether or not the power VCC2 and VM are supplied (i.e., VCC2 and VM=ON). If VCC and VM=ON, the program is executed at step S30.

The start of supplying the power VCC2 and VM is recognized by executing the firmware of the MPU inside the SOC 300 in response to a reset signal (not shown) to the SOC 300. Then, the control proceeds to step S30. On the contrary, when the state where the supply of the power VCC2 and VM is cut off continues (i.e., VCC2 and VM=OFF), the firmware of the MPU is not executed. Then, the control returns to step S10 and the sleep mode (power-OFF) continues.

In step S30, the engine controller 200 is activated, and respective function blocks of the engine controller 200 are initialized. Immediately after the startup of the engine controller 200, the engine controller 200 does not recognize the startup factor. Therefore, the control proceeds to step S40 and the SOC 300 checks the alarm flag (AFLG) of the RTC 205 to recognize the startup factor.

As a result of the checking, if AFLG="0" stands in step S50, it is determined that the startup factor of the engine controller 200 is turning on the power or recovery to the normal mode. When the engine controller 200 is activated by these two factors, the same processing is performed after the startup. In this case, the control proceeds to step S90 where operation of the printer is shifted to the normal mode. Meanwhile, if AFLG="1" stands in step S50, it is determined that the startup factor of the engine controller 200 is issuance of an alarm signal. In this case, the control proceeds to step S60 where the anti-sedimentation process or anti-fading process is performed.

Immediately after the process is completed, the control proceeds to step S70 where a Clear Flag command is issued to the RTC 205. As a result, in step S80, the supply of the power VCC2 and VM is cut off, and the control returns to the sleep mode in step S10.

According to the above-described embodiment, in a case where the anti-sedimentation process or anti-fading process is performed, the power supplied to the main circuits or the operation of the basic operation clock is recovered only in the engine controller to perform the anti-sedimentation process or anti-fading process. After these processes are completed, the power supplied to the main circuits or the operation of the basic operation clock is automatically cut off in the recovered engine controller, and the printer can return to the sleep mode.

By virtue of this process, regardless of whether the printer is in the normal mode or sleep mode, it is possible to perform anti-sedimentation process or anti-fading process on regular basis.

Furthermore, during a sleep mode, processes can be executed with the minimum power consumption. Upon completion of the anti-sedimentation process or anti-fading process, the printer automatically returns to the sleep mode state. Therefore, the present invention provides an advantage that the power consumption during the sleep mode can always be minimized although an operator is not conscious of power-saving.

Other Embodiment

When an error occurs in a printer system, normally the system controller mainly performs processing to deal with the error along with arbitration with the engine controller. In the above-described embodiment, for instance, if an error, e.g., paper jam or sensor failure, occurs during execution of the anti-sedimentation process or anti-fading process, the engine controller alone is unable to handle the error, and the abnormal state of the printer system is left unattended.

This embodiment describes an example incorporating a process that can avoid such situation in addition to the process of the above-described embodiment. Note that this embodiment also employs the printer that has been described above with reference to FIGS. 1 to 3.

When the anti-sedimentation process or anti-fading process is executed while the printer is in a sleep mode, if for instance a paper-jammed state is detected by a paper-jam sensor or a state in which mechanism control cannot be normally performed is detected due to failure of a mechanism-controlling sensor (system error occurrence), the SOC 300 raises the S_WAKE signal outputted from the output port 310 to "H" level, and the signal is inputted to the interruption input port 460 of the SOC 500. Note in this state, although the power AUXVCC1 is supplied to the SOC 500, the basic operation clock of the main unit of the SOC 500 is halted, and the SOC 500 is in the low power consumption state.

When the S_WAKE signal of "H" level is inputted as an interruption signal, the SOC 500 (i.e., system controller 400) recovers the power supply or the basic operation clock in the same procedure as that of the above-described case where the host unit 610 transmits a printing job to the printer in a sleep mode and an interruption signal is inputted from the interface 611. By this, the printer is shifted to the normal mode. Herein, this embodiment differs from the above-described embodiment in the factor that has recovered the system controller 400 from the sleep mode (low power consumption state) to the normal mode. Immediately after the system controller returns to the normal mode, the SOC 500 checks the interruption factor flag to determine the factor of recovery.

For instance, if the flag corresponding to the interruption input port (INT2) 460 is ON, and the signal level at the EVCC-ON input port (IN1) 450 is "H" level (or the corresponding flag is ON), the SOC 500 determines that the factor of recovery is an error that has occurred during execution of the anti-sedimentation process or anti-fading process while the printer is in a sleep mode. In this case, the system controller 400 inquires the engine controller 200 for the type of error.

Based on the data responded by the engine controller 200, the system controller 400 executes a process to deal with the error factor. If the printer alone cannot handle the error, the printer communicates with a status monitor (printer state management program) or printer driver installed in the host unit 610 and notifies the host unit of the error state of the printer. As a result, if necessary, an error message is displayed on a display monitor of the host unit to inform the printer's operator of the error occurrence and prompt the operator to take a necessary measure.

Figure 5:
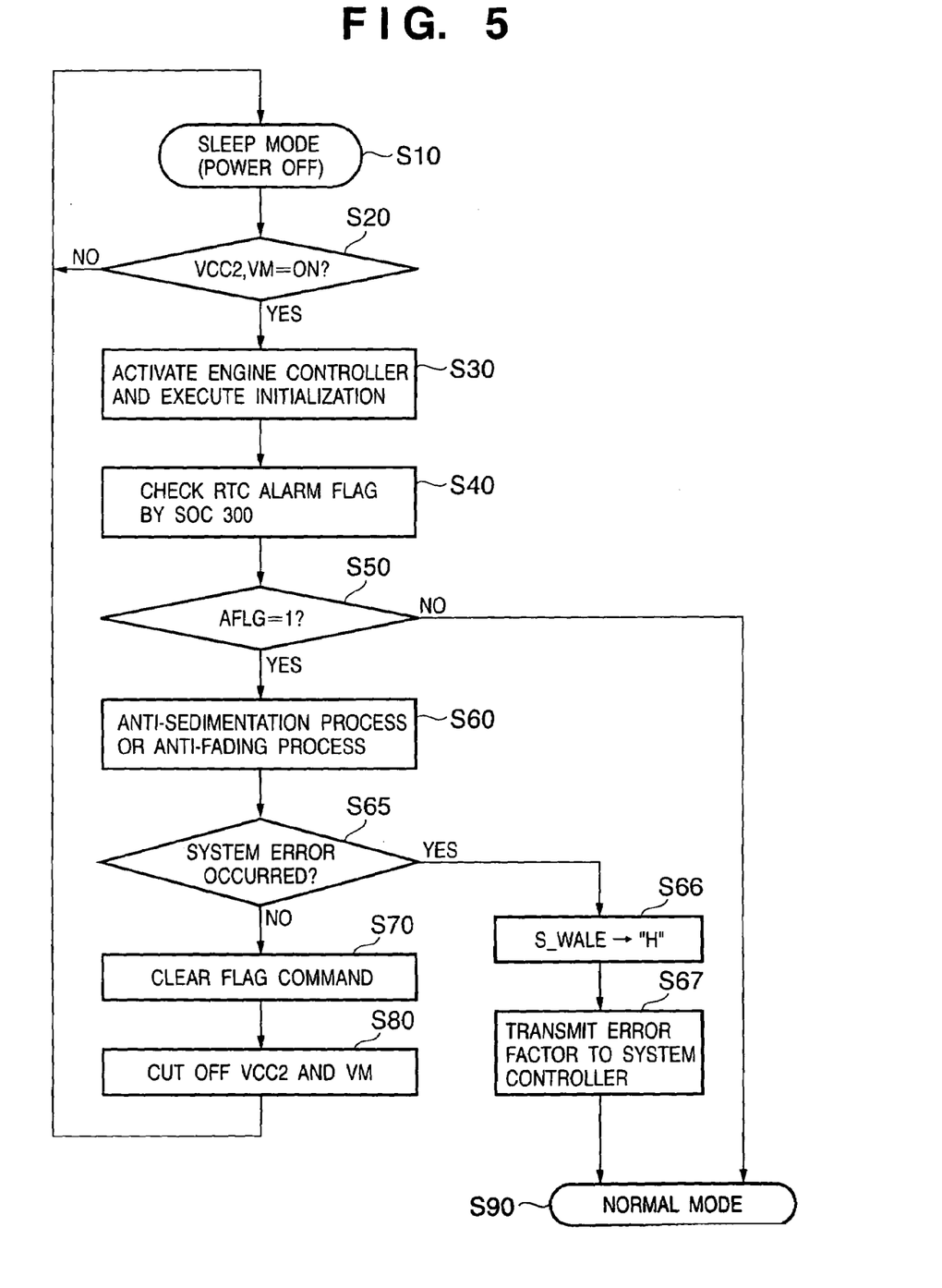
FIG. 5 is a flowchart showing an execution control of the anti-sedimentation process or anti-fading process executed by an engine controller during a sleep mode according to another embodiment.

The above-described processing is summarized in the flowchart in FIG. 5.

FIG. 5 is a flowchart showing an execution control of the anti-sedimentation process or anti-fading process executed by a firmware of the MPU inside the SOC 300 of the engine controller during a sleep mode according to this embodiment. Note that with respect to the same processing steps as those of the flowchart in FIG. 4 related to the above-described embodiment, the same step numbers are assigned in FIG. 5 and description thereof is omitted. Hereinafter, only the steps characteristic to the present embodiment are described.

In step S65, it is determined whether or not a system error has occurred during execution of the anti-sedimentation process or anti-fading process while the printer is in a sleep mode. If no system error is found, the control proceeds to step S70 and the same processing as that of the above-described embodiment is performed.

On the contrary, if a system error occurs during execution of the anti-sedimentation process or anti-fading process, the control proceeds to step S66. In step S66, to recover the power supplied to the system controller 400 or the basic operation clock, the SOC 300 raises the S_WAKE signal to "H" level and outputs the signal. In response to the S_WAKE signal of "H" level, the power supplied to the system controller 400 or the basic operation clock recovers. In this stage, since the engine controller 200 has already recovered its power supply or the basic operation clock, the printer is shifted to the normal mode.

Immediately after the printer is shifted to the normal mode, the system controller 400 determines a factor as to why the printer is shifted to the normal mode. In this case, since not only the S_WAKE signal of "H" level inputted from the interruption input terminal 460 (INT2) is the factor but also the signal level at the EVCC_ON input port (IN1) 450 is "H" level (or the corresponding flag is ON), the system controller 400 recognizes that a system error has occurred while the engine controller 200 executes the anti-sedimentation process or anti-fading process. Then, the system controller 400 inquires the engine controller 200 for the detail of system error.

In response to the inquiry, in step S67, the engine controller 200 transmits an error factor (e.g., paper-jam error) to the system controller 400. Then, the control proceeds to step S90 where the engine controller 200 maintains the normal mode. In the system controller 400, based on the error factor transmitted by the engine controller 200, a necessary measure is taken in the similar manner to the error processing in the normal mode.

According to the above-described embodiment, in a case where a system error occurs during execution of the anti-sedimentation process or anti-fading process while the printer is in a sleep mode, it is possible to recover the power supplied to the main circuits of the system controller or the basic operation clock, and have the system controller perform error-handling processing to deal with the system error.

Accordingly, an abnormal state of the printer is no longer left unattended, and it is possible to prompt an operator to take a necessary measure.

Figure 7:
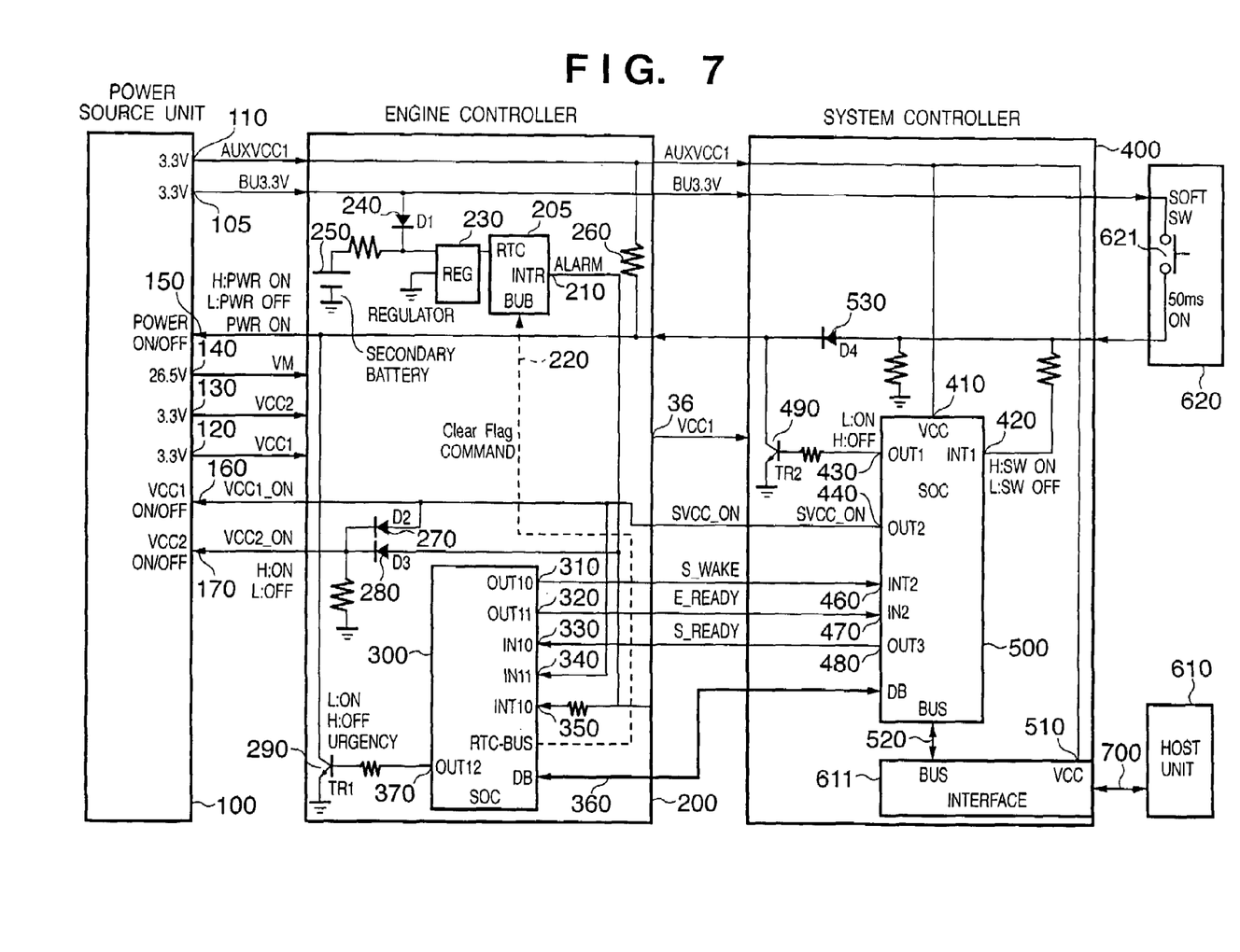
FIG. 7 is a block diagram showing another construction related to power management control in the printing apparatus.

Note that, as shown in FIG. 7, a configuration in which an alarm signal (ALARM) is inputted to the SOC 300 of the engine controller 200 and the power source unit 110 but the signal is not inputted to the SOC 500 of the system controller 400 is also applicable. In this configuration, after inputting the S_WAKE signal of "H" level, the system controller 400 inquires the engine controller 200 for the system error.

Further note that in the foregoing embodiments, although the description has been provided based on an assumption that a droplet discharged by the printhead is ink and that the liquid contained in the ink tank is ink, the contents are not limited to ink. For instance, the ink tank may contain processed liquid or the like, which is discharged to a printing medium in order to improve the fixability or water repellency of the printed image or to improve the image quality.

Each of the above-described embodiments comprises means (e.g., an electrothermal transducer or the like) for generating heat energy as energy utilized upon execution of ink discharge, and adopts the method which causes a change in state of ink by the heat energy, among the ink-jet printing method. According to this printing method, a high-density, high-precision printing operation can be attained.

Furthermore, although each of the above-described embodiments adopts a serial-type printer which performs printing by scanning a printhead, a full-line type printer employing a printhead having a length corresponding to the width of a maximum printing medium may be adopted. For a full-line type printhead, either the arrangement which satisfies the full-line length by combining a plurality of printheads as described above or the arrangement as a single printhead obtained by forming printheads-integrally can be used.

In addition, the printer of the present invention may be used in the form of a copying machine combined with a reader, and the like, or a facsimile apparatus having a transmission/reception function, in addition to an integrally-provided or stand-alone image output terminal of a data processing equipment such as a computer.

The present invention can be applied to a system constituted by a plurality of devices or to an apparatus comprising a single device.

As many apparently widely different embodiments of the present invention can be made without departing from the spirit and scope thereof, it is to be understood that the invention is not limited to the specific embodiments thereof except as defined in the appended claims.

What is claimed is:

1. A power management control method of a printing apparatus, having a first controller for receiving data transmitted by a host unit, performing image processing on the received data, and generating bitmap data and a second controller for controlling the printing apparatus to execute printing on a printing medium based on the bitmap data, operating in a first operation mode of low power consumption, a second operation mode of intermediate power consumption and a third operation mode of high power consumption, wherein the first and second controllers are inoperative in the first operation mode, the first controller is inoperative while the second controller is operative in the second operation mode, and the first and second controllers are operative in the third operation mode, comprising:

a detection step of detecting whether or not any of a plurality of events that cause a shift from the first operation mode to either the second or third operation mode has occurred;

a shift step of shifting an operation mode of the printing apparatus from the first operation mode to either the second or third operation mode based on a detection result at said detection step;

a discrimination step of discriminating whether or not the event detected at said detection step is an event for a maintenance operation executed periodically by the printing apparatus for maintaining an excellent printing state;

a control step of performing control to shift the operation mode of the printing apparatus from the first operation mode to the second operation mode so as to execute the maintenance operation in a case where it is discriminated at said discrimination step that the event detected at said detection step is an event for a maintenance operation, while performing control to shift the operation mode of the printing apparatus from the first operation mode to the third operation mode so as to be ready to execute a corresponding operation in a case where it is discriminated at said discrimination step that the event detected at said detection step is an event other than the event for the maintenance operation; and a return step of returning the operation mode of the printing apparatus from the second operation mode to the first operation mode.

2. The method according to claim 1, wherein the event further includes data reception from a host unit and operator operation performed on an operation panel of the printing apparatus.

3. The method according to claim 1, further comprising:

a second detection step of detecting whether or not a failure has occurred during execution of the maintenance operation; and a second control step of performing control such that power is supplied to the entire printing apparatus based on a detection result at said second detection step.

4. A printing apparatus, having a first controller for receiving data transmitted by a host unit, performing image processing on the received data, and generating bitmap data and a second controller for controlling said printing apparatus to execute printing on a printing medium based on the bitmap data, operative in a first operation mode of low power consumption, a second operation mode of intermediate power consumption and a third operation mode of high power consumption, wherein the first and second controllers are inoperative in the first operation mode, the first controller is inoperative while the second controller is operative in the second operation mode, and the first and second controllers are operative in the third operation mode, comprising:

detection means for detecting whether or not any of a plurality of events that cause a shift from the first operation mode to either the second or third operation mode has occurred;

shift means for shifting an operation mode of said printing apparatus from the first operation mode to either the second or third operation mode based on a detection result of said detection means;

discrimination means for discriminating whether or not the event detected by said detection means is an event for a maintenance operation executed periodically by said printing apparatus for maintaining an excellent printing state;

control means for performing control to shift the operation mode of said printing apparatus from the first operation mode to the second operation mode so as to execute the maintenance operation in a case where it is discriminated by said discrimination means that the event detected by said detection means is an event for a maintenance operation, while performing control to shift the operation mode of said printing apparatus from the first operation mode to the third operation mode so as to be ready to execute a corresponding operation in a case where it is discriminated by said discrimination means that the event detected by said detection means is an event other than the event for the maintenance operation; and return means for returning the operation mode of said printing apparatus from the second operation mode to the first operation mode.

5. The apparatus according to claim 4, further comprising a mechanism unit for performing printing on the printing medium by conveying the printing medium and scanning a printhead.

6. The apparatus according to claim 5, wherein
said second controller includes a timer for notifying execution timing of the maintenance operation.

7. The apparatus according to claim 5, wherein the printhead is an inkjet printhead which performs printing by discharging ink.

8. The apparatus according to claim 7, wherein the inkjet printhead comprises an electrothermal transducer for generating heat energy to be applied to ink so as to discharge ink by utilizing the heat energy.

9. The apparatus according to claim 7, further comprises comprising an ink tank for supplying the inkjet printhead with ink.

10. The apparatus according to claim 9, wherein the maintenance operation includes at least one of:
a process for periodically stirring pigmented ink stored in the ink tank; and
in a case where the printing medium is roll paper, a process for periodically conveying the roll paper by a slight amount between one printing operation and a next printing operation.

11. The apparatus according to claim 4, wherein the event further includes data reception from a host unit and operator operation performed on an operation panel of said printing apparatus.

12. The apparatus according to claim 4, wherein said second controller further includes:
monitoring means for monitoring whether or not a failure has occurred during execution of the maintenance operation; and
control means for performing control such that power is supplied to the entire printing apparatus based on a monitoring result of said monitoring means.

13. The apparatus according to claim 4, further comprising a power supply unit that independently supplies power to the first controller and the second controller, based on a detection result of said detection means.

* * * * *

UNITED STATES PATENT AND TRADEMARK OFFICE
CERTIFICATE OF CORRECTION

PATENT NO. : 7,278,705 B2
APPLICATION NO. : 10/842484
DATED : October 9, 2007
INVENTOR(S) : Ohara It is certified that error appears in the above-identified patent and that said Letters Patent is hereby corrected as shown below:

COLUMN 5:
Line 1, "control-of" should read --control of--.

COLUMN 8:
Line 18, "includes" should read --include--.
Line 38, "Numeral" should read --Numerals--.

COLUMN 10:
Line 57, "power switch 62" should read --power switch 621--.

COLUMN 12:
Line 20, "is" should read --are--.
Line 51, "SVCC-ON signal" should read --SVCC_ON signal--.

COLUMN 13:
Line 19, "regular" should read --a regular--.

COLUMN 14:
Line 35, "VCC" should read --VCC2--.

COLUMN 15:
Line 17, "regular" should read --a regular--.

COLUMN 16:
Line 6, "EVCC-ON" should read --EVCC_ON--.

COLUMN 17:
Line 45, "printheads-integrally" should read --printheads integrally--.

UNITED STATES PATENT AND TRADEMARK OFFICE
CERTIFICATE OF CORRECTION

PATENT NO. : 7,278,705 B2
APPLICATION NO. : 10/842484
DATED : October 9, 2007
INVENTOR(S) : Ohara

It is certified that error appears in the above-identified patent and that said Letters Patent is hereby corrected as shown below:

COLUMN 18:
Line 39, "operator" should read --an operator's--.

COLUMN 20:
Line 5, "comprises" should be deleted.
Line 17, "operator" should read --an operator's--.

Signed and Sealed this

Tenth Day of March, 2009

JOHN DOLL
*Acting Director of the United States Patent and Trademark Office*